US008321538B2

(12) United States Patent
Ford et al.

(10) Patent No.: US 8,321,538 B2
(45) Date of Patent: Nov. 27, 2012

(54) AUTONOMOUS NETWORK DEVICE CONFIGURATION METHOD

(75) Inventors: Daniel E. Ford, Granite Bay, CA (US); Charles F. Clark, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1464 days.

(21) Appl. No.: 11/903,601

(22) Filed: Sep. 24, 2007

(65) Prior Publication Data
US 2009/0083398 A1 Mar. 26, 2009

(51) Int. Cl.
G06F 15/16 (2006.01)
G06F 15/177 (2006.01)
G06F 9/44 (2006.01)
G06F 9/445 (2006.01)
G06F 9/06 (2006.01)
G06F 7/04 (2006.01)
G06F 17/30 (2006.01)

(52) U.S. Cl. ........ 709/220; 709/201; 709/203; 709/217; 709/219; 709/221; 717/120; 717/130; 717/168; 717/170; 717/172; 717/173; 717/174; 717/175; 717/176; 717/177; 717/178; 726/19; 726/22; 726/28; 726/30

(58) Field of Classification Search ........................ None
See application file for complete search history.

(56) References Cited

U.S. PATENT DOCUMENTS

| | | | | |
|---|---|---|---|---|
| 5,675,831 A * | 10/1997 | Caputo | 710/10 |
| 5,815,682 A * | 9/1998 | Williams et al. | 703/25 |
| 5,838,907 A * | 11/1998 | Hansen | 709/220 |
| 5,860,012 A * | 1/1999 | Luu | 717/175 |
| 6,009,274 A * | 12/1999 | Fletcher et al. | 717/173 |
| 6,094,679 A * | 7/2000 | Teng et al. | 709/220 |
| 6,282,711 B1 * | 8/2001 | Halpern et al. | 717/175 |
| 6,301,710 B1 * | 10/2001 | Fujiwara | 717/175 |
| 6,408,434 B1 * | 6/2002 | Fujiwara | 717/170 |
| 6,567,860 B1 * | 5/2003 | Maxwell et al. | 719/327 |
| 7,519,561 B2 * | 4/2009 | Boomershine et al. | 705/400 |
| 2001/0042112 A1 * | 11/2001 | Slivka et al. | 709/220 |
| 2002/0122076 A1 * | 9/2002 | Nakaki | 345/847 |
| 2002/0188941 A1 * | 12/2002 | Cicciarelli et al. | 717/175 |
| 2003/0046682 A1 * | 3/2003 | Crespo et al. | 717/178 |
| 2003/0051235 A1 * | 3/2003 | Simpson | 717/174 |
| 2003/0121033 A1 * | 6/2003 | Peev et al. | 717/175 |
| 2003/0217126 A1 * | 11/2003 | Polcha et al. | 709/220 |
| 2004/0139308 A1 * | 7/2004 | Foster et al. | 713/1 |
| 2004/0187105 A1 * | 9/2004 | Inada | 717/174 |
| 2004/0249908 A1 * | 12/2004 | Valladares et al. | 709/221 |
| 2005/0055686 A1 * | 3/2005 | Buban et al. | 717/170 |
| 2005/0108705 A1 * | 5/2005 | Koyama | 717/174 |
| 2005/0158100 A1 * | 7/2005 | Yamaguchi et al. | 400/62 |
| 2005/0198630 A1 * | 9/2005 | Tamma et al. | 717/175 |
| 2006/0010435 A1 * | 1/2006 | Jhanwar et al. | 717/168 |

(Continued)

*Primary Examiner* — Moustafa M Meky
*Assistant Examiner* — Ho Shiu

(57) ABSTRACT

An embodiment of the present invention comprises a method of configuring one or more target network devices for operation, that further comprises the steps of creating an object for deployment to a predetermined target network device, the object having configuration data for configuring the target network device, and at least one of identification data identifying the object, an autonomous encapsulated agent for executing necessary steps for installing the configuration data, identification data identifying the predetermined target network device, and authentication data for authenticating at least one of the predetermined target network device identification data and object identification data, transporting the object to the predetermined target network device, and the autonomous encapsulated agent begins an on-site process of installing the configuration data in the predetermined target network device.

19 Claims, 3 Drawing Sheets

U.S. PATENT DOCUMENTS

| | | | |
|---|---|---|---|
| 2006/0041509 A1* | 2/2006 | Koerber | 705/51 |
| 2006/0048145 A1* | 3/2006 | Celli et al. | 717/177 |
| 2006/0080659 A1* | 4/2006 | Ganji | 717/178 |
| 2006/0224705 A1* | 10/2006 | Takase | 709/220 |
| 2006/0242697 A1* | 10/2006 | Takemura | 726/19 |
| 2006/0248524 A1* | 11/2006 | Seely | 717/174 |
| 2006/0253617 A1* | 11/2006 | Lin et al. | 710/8 |
| 2006/0259904 A1* | 11/2006 | Celli et al. | 717/174 |
| 2006/0259966 A1* | 11/2006 | Ilnicki | 726/22 |
| 2007/0006220 A1* | 1/2007 | Han | 717/174 |
| 2007/0250924 A1* | 10/2007 | Ono et al. | 726/19 |
| 2007/0294362 A1* | 12/2007 | Patel | 709/217 |
| 2008/0130639 A1* | 6/2008 | Costa-Requena et al. | 370/389 |
| 2008/0155534 A1* | 6/2008 | Boss et al. | 717/178 |
| 2008/0235299 A1* | 9/2008 | Haselton et al. | 707/204 |
| 2008/0244333 A1* | 10/2008 | Owen et al. | 714/48 |
| 2008/0320308 A1* | 12/2008 | Kostiainen et al. | 713/171 |
| 2009/0037486 A1* | 2/2009 | Ozawa | 707/200 |
| 2009/0063620 A1* | 3/2009 | Hanna et al. | 709/203 |
| 2009/0064197 A1* | 3/2009 | Klyuchevsky | 719/327 |
| 2009/0077206 A1* | 3/2009 | Dunn et al. | 709/220 |
| 2009/0276318 A1* | 11/2009 | Broadbent et al. | 705/14.64 |
| 2010/0115269 A1* | 5/2010 | Allen et al. | 713/157 |
| 2010/0122093 A1* | 5/2010 | Tuyls et al. | 713/180 |
| 2010/0325426 A1* | 12/2010 | Dixon | 713/156 |
| 2011/0191770 A1* | 8/2011 | Inoue | 717/178 |

* cited by examiner

AUTONOMOUS NETWORK DEVICE CONFIGURATION METHOD

BACKGROUND OF THE INVENTION

The present invention generally relates to networks and configuring devices in such networks.

Management applications generally require direct access to target devices, such as routers, switches and hubs, for example, in order to ensure that the appropriate target device receives the configuration data.

If the central network administrator does not have physical access to the target devices, then the network administrator must trust the technicians that do have physical access to the device. It is very undesirable to grant such limited-trust technicians full access to the data contained in the configuration.

Current deployment solutions have a limited capability to ensure that the configuration is deployed only to the intended targeted device. This is particularly true if the deployment must occur through a secondary computational device, such as a laptop or notebook computer or PDA.

If the configurations need to be deployed via an indirect channel, such as a technician physically interacting with the target device using a laptop or PDA, then it is difficult to ensure that the configuration remains in existence for only a specified duration of time. Therefore timeliness of the deployment is difficult to ensure.

If the configuration is deployed indirectly, the configurations (in current implementations) would remain on the intermediate device, such as laptop or PDA. thus allowing a malicious technician to have time to attack the encrypted configuration and potentially compromise the data integrity.

Current practice is to encapsulate configurations in simple text files. Even though it is possible to encrypt such text files to protect them during transit to the target device, without an autonomous encapsulated agent, it is not possible for the configuration itself to enforce the intended use of the configuration. Such enforcement would have to be implemented by management applications requiring direct interaction with the target device. Such requirements increase the cost and complexity of management solutions, and also impose undesirable connectivity requirements.

SUMMARY OF THE INVENTION

One embodiment of the present invention comprises a method of configuring one or more target network devices for operation, that further comprises the steps of creating an object for deployment to a predetermined target network device, the object having configuration data for configuring the target network device, and at least one of identification data identifying the object, an autonomous encapsulated agent for executing necessary steps for installing the configuration data, identification data identifying the predetermined target network device, and authentication data for authenticating at least one of the predetermined target network device identification data and object identification data, transporting the object to the predetermined target network device, and the autonomous encapsulated agent begins an on-site process of installing the configuration data in the predetermined target network device.

DESCRIPTION OF THE EMBODIMENTS

The present invention involves embodiments of a method of protecting and reliably installing configuration data on network devices such as routers, switches and hubs, for example. Currently, a remote network administrator has to create the configuration file for a network device as a text file and somehow get it to a remote assistant, such as by email, and the assistant receives the file, opens it, and after physically configuring the device, then download the configuration data into the device. The assistant or technician has to have or know the security credentials that are needed in order to log into the device. Physical access by the person is often necessary, i.e., the person may need to walk up to the device and connect a cable from a laptop computer to the device, for example, or to physically manipulate the switches or settings on the device. Very often the device will be in another building or a different city from where the network administrator is sitting, so it is desirable to connect to the device over a network and apply configuration changes over the network. However, not everything about configuring a device is possible without being physically present, because part of the configuration process requires placing the device in a rack, plugging in wires in the ports, plugging in the power cord and turning it on.

Configuration data is sensitive because it will contain policies as to how a particular network device is to behave. For example, it will have policies that certain users cannot get access to certain ports, or certain users cannot send traffic through a certain port. Configurations determine the kind of traffic that is permitted and the traffic priorities that the central administrator wants to go through the device. That kind of information, if available to an attacker, is exactly the kind of information that the attacker would like to have access to. It is desirable to limit that amount of trust that is given to a local assistant or technician and to be able to configure the device without having to disclose the information to the assistant or others in an organization.

Embodiments of the present invention create a single software object, into which is tightly encapsulated a network device configuration coupled with software that enables the unit to autonomously install itself into the appropriate target device and automatically delete itself after successful deployment.

Figure 1:
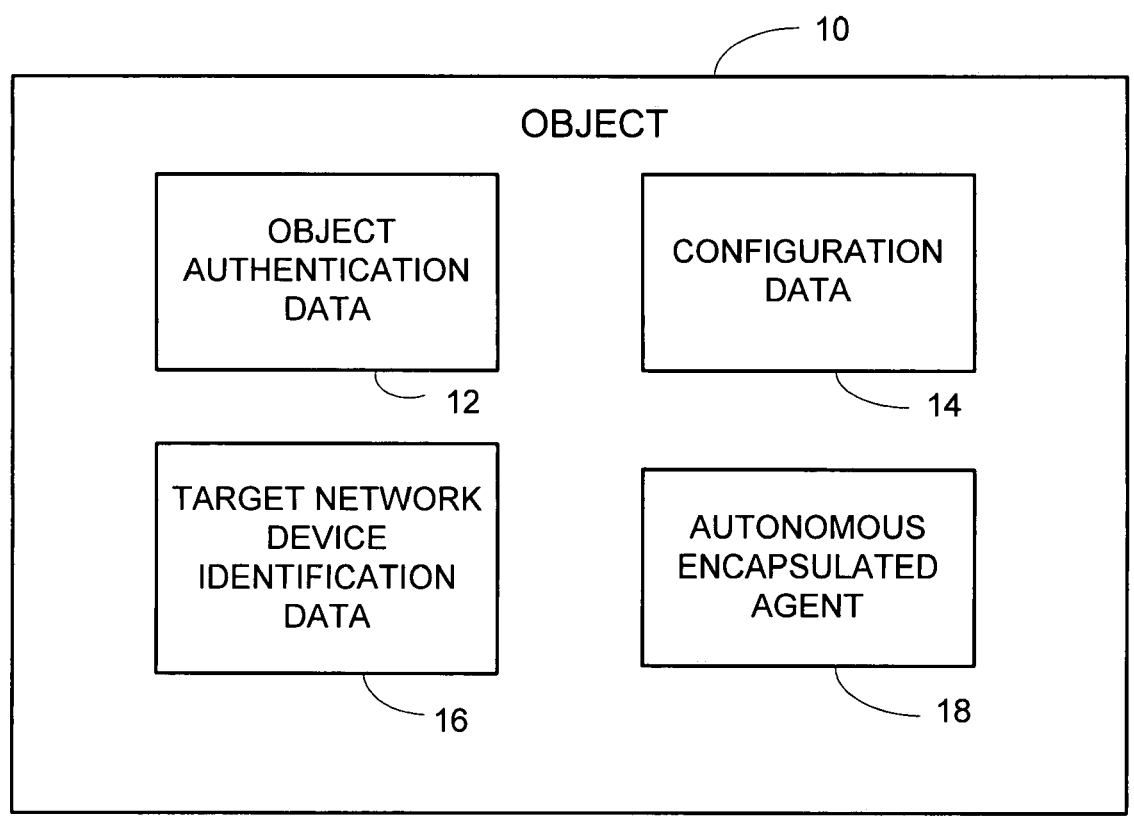
FIG. 1 is a block diagram of an object having attributes of the present invention.

Turning to the drawings and particularly FIG. 1, an object 10 is created which preferably comprises authentication data 12 for authenticating the object itself, configuration data 14 for target devices such as routers, switches and hubs, for example, although the present invention can be used with other types of devices that are capable of being configured. The object 10 also comprises identification data for the target device 16 and an autonomous encapsulated agent 18

Embodiments of the invention employ network device configurations that would be encapsulated into a tightly coupled module or block containing both data and the autonomous encapsulated software agent 18. The entire configuration for such a device can be set up in the form of a text file that has information about how that device is to be configured. The configuration files are constructed for these network devices and contain information, for example, internet protocol (or "IP") address, simplified network management protocol (or "SNMP") community strings necessary for the network device to properly communicate on the network, the operating speed of particular ports of the device; the name given to the device, the users that are allowed to access the device, the security credentials that are needed to access the device, for example. There may be a long list of items that need to be configured. That information can be extracted from the devices and can also be redeployed back to the devices to restore the devices back to a specific configuration state.

The configuration text file contain configuration data destined for configuring the device, plus code, i.e., instructions that would be executed automatically as soon as that file was downloaded onto a personal computer or onto a switch. Those instructions would cover what could be done with the configuration data that was bundled within that block or object. In order to implement this, the autonomous agent 18 must be deployed on the device that can examine these encapsulated configuration files and execute the instructions contained within them and be able to decrypt them and determine if a particular file is destined for it or not.

If an assistant or technician does not have the security keys that decrypt the block of data were to look at the block of data, it is not possible to tear it apart and identify the part that defines the configuration, or the part that contains the instructions or the part of the key for decrypting. It would not be possible for anyone to analyze the content of the block of data. The block therefore contains configuration data, instructions and security keys that are encrypted. Someone who does not have the proper credentials would be unable to identify the boundaries of the three different parts of the block of data, much less determine what the text file contains.

The software agent is preferably an executable agent that exposes a programmatic interface capable of interacting with potential target network devices. In other words, if it were installed in a switch device, the agent in the switch would trigger execution of the code imbedded in the configuration file.

Figure 2:
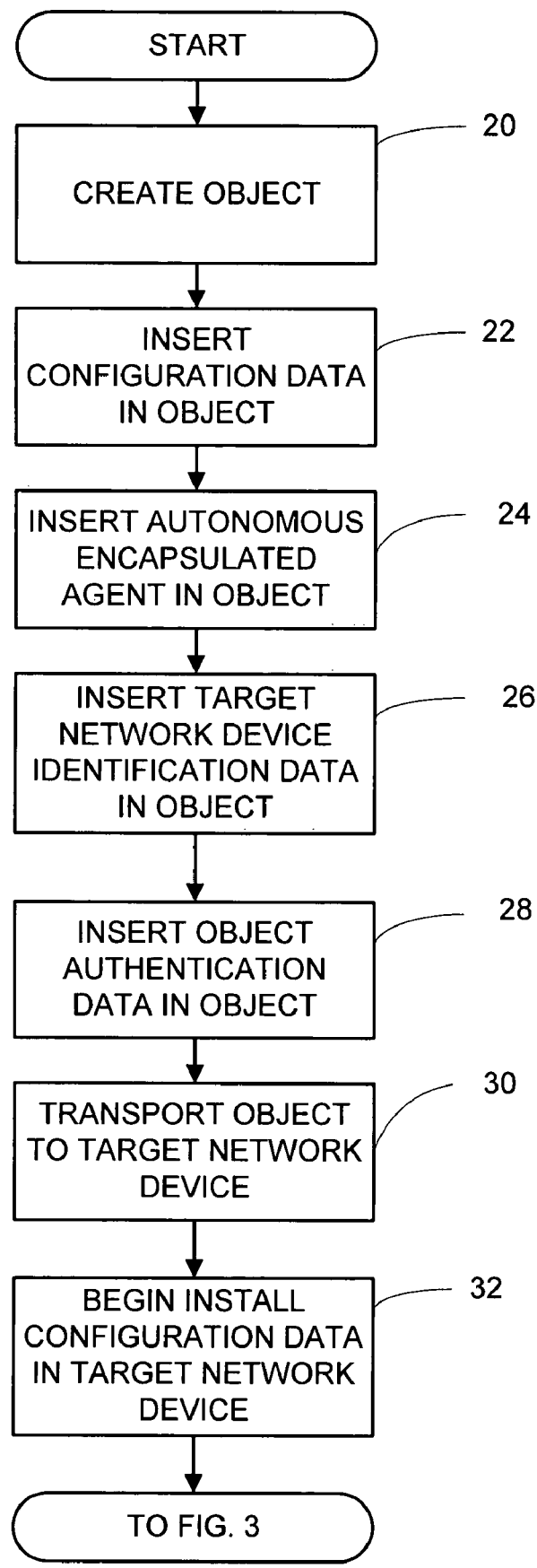
FIG. 2 is a flow diagram for carrying out a beginning portion of an embodiment of the method of the present invention.
Figure 3:
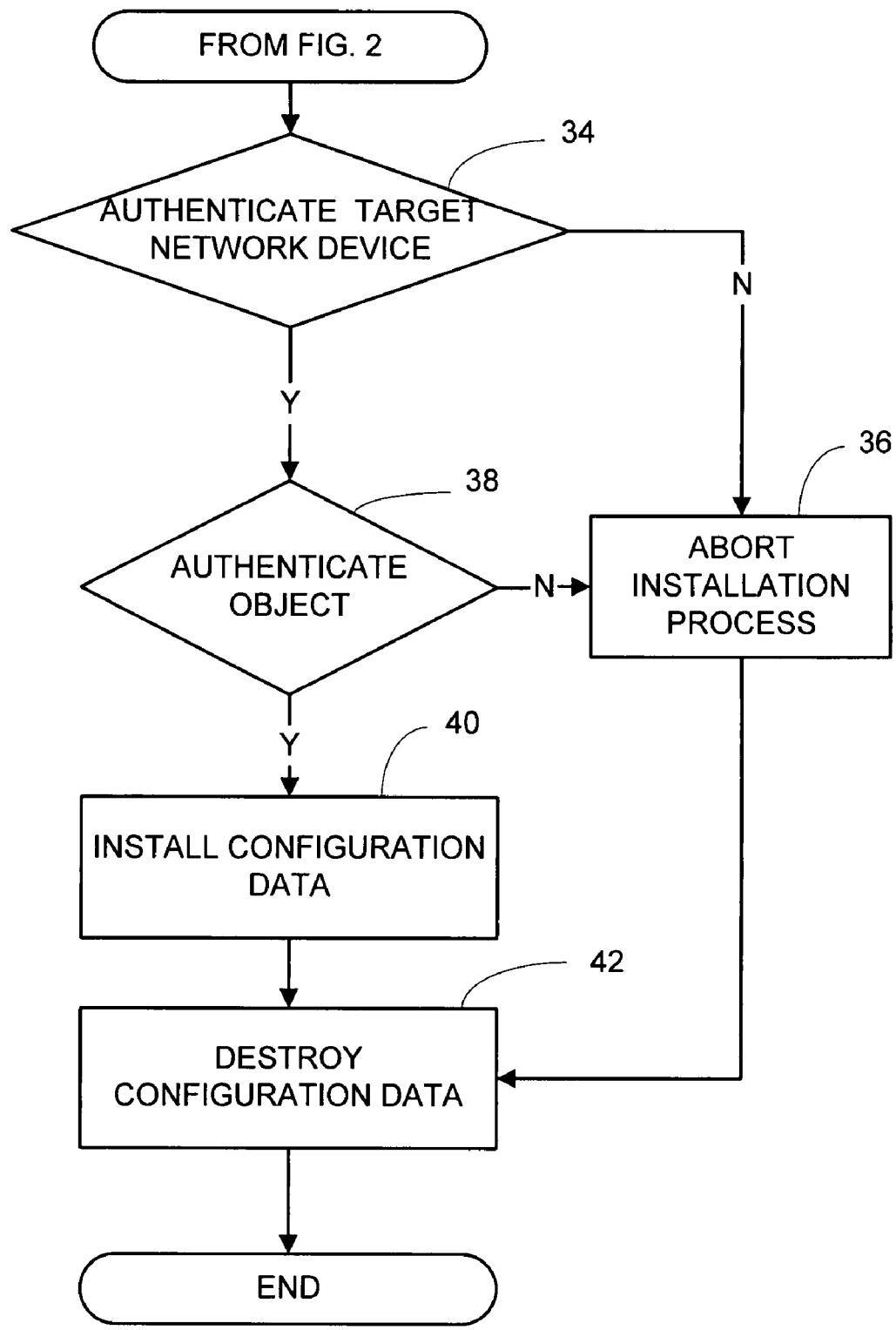
FIG. 3 is a flow diagram for carrying the remaining portion of an embodiment of the method of the present invention.

The object 10 shown in FIG. 1 is constructed in the manner as shown in the flow diagram of FIG. 2 whereby an object is created (block 20) and then configuration data for a target device is inserted in the object (block 22). This is followed by insertion of an autonomous encapsulated agent in the object (block 24) as well as the target network device identification data (block 26). Similarly, the object itself is provided with object authentication data (block 28). At this point, the object as shown in FIG. 1 is complete and it is then necessary to transport the object (block 30) to a target network device. This can be done by transmitting the object over a network or the internet or can be loaded onto an intermediate device such as a laptop, PDA, or other device that is capable of storing the object. When it is in communication with the target network device, such as by a direct link from a laptop to the device, for example, the installation process in the target network device is begun (block 32).

The first thing that is done is to authenticate the target network device (block 34). More particularly, once the agent detects contact with a network device (via a serial port, a USB connection, or even a standard network connection), it verifies that the device it is in contact with is the intended target device. This is done by validating certificates or other security credentials available on the target device.

If it is not authenticated, then the installation process is aborted (block 36). If it is authenticated then the object 10 also supplies its own credentials to the target device in order for the target device to validate the authenticity of the object transporting the configuration data (block 38). Once mutual authentication is complete, the agent deploys the configuration to the device in a secure fashion.

If that authentication is confirmed, then the configuration data is installed on the target device, (block 40), but if not, then the installation process is aborted (block 36). Once the deployment to the target device is complete, the agent 18 destroys the configuration data, (42) and terminates its own execution existence. There are different platforms that support different mechanisms for deleting data or files. If it was on a USB flash drive, and you put the flash drive on a laptop computer, the Windows operating system would automatically execute the autoexec code and would execute whatever it is supposed to do.

It is desired that the installation of the configuration data be done within a predetermined time period from a predetermined start event, and if it is not installed also results in the destruction of the configuration data (block 42). Thus, in neither event, the configuration data is not left intact on a technician or assistant's laptop, for example, and is therefore not vulnerable to improper or inadvertent misappropriation.

There are several advantages of the embodiments of the present invention. The device configurations can be deployed over indirect and insecure delivery channels without concern for compromising the contained configuration. By indirect, it is meant that the configuration can be deployed to an intermediate computational device (such as a laptop or notebook computer or a PDA), which in turn delivers it to the target device.

Also, the source of the autonomous configuration, which is preferably an authorized management application, need not have physical connectivity with the target device. Such autonomous configurations can be given to technicians with only a limited security clearance, because it is very unlikely that such limited trust technicians would be able to decode and read the configuration data. The embodiments only deploy the configuration data to an authorized and intended target device and deploy the configuration in a timely manner. This is because if the autonomous configuration is not deployed to the target device within a specified window of time, it self-destructs. The embodiments also substantially eliminate unauthorized access to the configuration after deployment, for the same reason that the autonomous configuration self-destructs after a successful deployment.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A method of configuring one or more target network devices for operation, said method comprising:
    creating an object for deployment to a predetermined target network device, said object having identification data identifying said object;
    inserting configuration data for configuring said target network device in said object;
    inserting an autonomous encapsulated agent in said object, wherein the autonomous encapsulated agent is to authenticate the target network device;
    inserting identification data identifying said predetermined target network device in said object;
    inserting authentication data in said object for use by the autonomous encapsulated agent in authenticating said predetermined target network device identification data and object identification data; and
    installing said configuration data on-site in said predetermined target network device using said autonomous encapsulated agent in response to the identification of the target network device being authenticated by the autonomous encapsulated agent.

2. The method as defined in claim 1 wherein installing said configuration data on-site comprises:
   said agent authenticating the identification of said predetermined target network device;
   said predetermined target network device authenticating the identification of said object;
   said agent installing said configuration data in said predetermined target network device when said authenticating steps successfully authenticate said object identification and said predetermined target network device identification; and
   said agent aborting the on-site installing process if said authenticating steps fail to authenticate said object identification and said predetermined target network device identification.

3. The method as defined in claim 2, further comprising:
   said agent destroying said configuration data subsequent to installing said configuration data on-site being completed or aborted.

4. The method as defined in claim 3, further comprising:
   said agent destroying said configuration data if said on-site installing process is not completed in a first predetermined time period.

5. The method as defined in claim 1, further comprising:
   transmitting said object to said predetermined target network device via a network.

6. The method as defined in claim 1 further comprising:
   transmitting said object to said predetermined target network device via the Internet.

7. The method as defined in claim 1, further comprising:
   transferring said object to an intermediate device;
   physically interacting said intermediate device with said predetermined target network device; and
   transferring said object to said predetermined target network device.

8. The method as defined in claim 7, wherein said intermediate device comprises one of laptop computer, a notebook computer or a PDA device.

9. The method as defined in claim 1, wherein said creating and inserting steps are executed in a network management application.

10. The method as defined in claim 1, wherein a predetermined target network device comprises one of a computer, server, router, network switch, node, gateway, printer, scanner, multi-function device or other configurable network device.

11. A method of configuring one or more target network devices for operation, said method comprising:
   creating an object for deployment to a predetermined target network device, said object having configuration data to configure said target network device, said object having identification data identifying said object, said object having an autonomous encapsulated agent to authenticate an identification of the target network device and to install said configuration data, said object having identification data identifying said predetermined target network device, and said object having authentication data for use by the autonomous encapsulated agent in authenticating said predetermined target network device identification data and object identification data;
   transporting said object to said predetermined target network device; and
   installing said configuration data on-site in said predetermined target network device using said autonomous encapsulated agent in response to the identification of the target network device being authenticated by the autonomous encapsulated agent.

12. The method as defined in claim 11, further comprising:
   said agent destroying said configuration data in said object within a predetermined time period from a predetermined start event.

13. The method as defined in claim 11, further comprising:
   said agent aborting installation of the configuration data when said agent fails to authenticate the identification of either said predetermined target network device or said object.

14. The method as defined in claim 11, wherein said identification data identifying said predetermined target network device comprises either validating certificates or security credentials resident on said predetermined target network device.

15. The method as defined in claim 11, further comprising:
   destroying said configuration data by automatically executing an autoexec code for deleting said data.

16. A method of configuring one or more target network devices for operation, comprising:
   creating an object for deployment to a predetermined target network device, said object having identification data identifying said object;
   inserting configuration data for configuring said target network device in said object;
   inserting an autonomous encapsulated agent in said object;
   inserting identification data identifying said predetermined target network device in said object;
   inserting authentication data in said object authenticating said predetermined target network device identification data and object identification data;
   transporting said object having said inserted configuration data, autonomous encapsulated agent, predetermined target network device identification data, and object identification data to said predetermined target network device; and
   installing said configuration data in said predetermined target network device using said autonomous encapsulated agent in an on-site process comprising:
   authenticating the identification of said predetermined target network device using said autonomous encapsulated agent;
   authenticating the identification of said object using said predetermined target network device; and
   installing said configuration data in said predetermined target network device using said autonomous encapsulated agent when said authenticating steps successfully authenticate said object identification and said predetermined target network device identification.

17. The method as defined in claim 16, wherein said object comprises said identification data, said authentication data, said configuration data, and said autonomous encapsulated agent, said autonomous encapsulated agent being a configuration data installer.

18. The method as defined in claim 16, wherein said configuration data comprises at least one of:
   a policy that restricts access to a network port to a defined user;
   a policy that prevents the defined user from sending traffic through the network port;
   a policy that identifies a kind of traffic that is permitted over the network port; and
   a policy that identifies traffic priorities through the network port.

19. The method as defined in claim 16, further comprising extracting existing configuration data from said predetermined target network device using said autonomous encapsulated agent prior to said step of installing.

* * * * *